United States Patent [19]

Fourmaud et al.

[11] Patent Number: 4,739,335

[45] Date of Patent: Apr. 19, 1988

[54] SYSTEM FOR THE CENTRALIZED CONTROL OF A PLURALITY OF RADIOCOMMUNICATIONS AND RADIO NAVIGATION APPARATUS MOUNTED ON BOARD AN AIRCRAFT

[75] Inventors: Gérald Fourmaud, Blagnac; Claude Pichavant; Gilles Fornasier, both of Toulouse, all of France

[73] Assignee: Aerospatiale Societe Nationale Industrielle, Paris, France

[21] Appl. No.: 932,655

[22] Filed: Nov. 19, 1986

[30] Foreign Application Priority Data

Nov. 20, 1985 [FR] France ................................ 85 17181

[51] Int. Cl.[4] ............................................. G01S 13/91
[52] U.S. Cl. ...................................... 342/451; 371/11
[58] Field of Search ................ 342/451, 454; 364/424, 364/434, 450, 451; 371/8, 9, 11

[56] References Cited

U.S. PATENT DOCUMENTS

4,220,994 9/1980 Hendrickson ........................ 364/450
4,622,667 11/1986 Yount ................................... 364/434

Primary Examiner—Theodore M. Blum
Assistant Examiner—Bernarr Earl Gregory
Attorney, Agent, or Firm—Marshall, O'Toole, Gerstein, Murray & Bicknell

[57] ABSTRACT

A system is provided for the centralized control of two groups of radiocommunications apparatus and two groups of radionavigational apparatus mounted on board an aircraft provided with two flight management computers, each of said flight management computers controlling the operation of the radionavigational apparatus of one of said groups. This system comprises two control devices dialoguing with each other respectively associated with said groups of radiocommunications apparatus and each including computing means, radiocommunications apparatus selection means, radionavigational apparatus selection means, frequency adjustment means and switching means. These two control devices are adapted for controlling the radiocommunications apparatus associated with the other, as well as the radionavigational apparatus associated with one of said flight management computers.

6 Claims, 8 Drawing Sheets

Fig. 2

SYSTEM FOR THE CENTRALIZED CONTROL OF A PLURALITY OF RADIOCOMMUNICATIONS AND RADIO NAVIGATION APPARATUS MOUNTED ON BOARD AN AIRCRAFT

BACKGROUND OF THE INVENTION

The present invention relates to a system for the centralized control of a plurality of radio communications and radio navigation apparatus mounted on board an aircraft.

It is known that, particularly for reasons of safety and ease of working, an aircraft comprises a plurality of radio communications apparatus which may be used independently or simultaneously by any one of the crew members. Each of these radio communications apparatus has its own control device so that there is excessive over crowding of the flight deck as well as a lack of flexibility in use.

It is further known that large modern commercial aircraft are provided with flight management computers calculating the position of the aircraft and working out the flight plans. These flight management computers control more particularly certain radio navigational apparatus. Generally, two flight management computers are provided on board such ah aircraft, with each of which is associated a group of navigational apparatus.

The present invention provides a system for the generalized use of the flight management computers and of all the radio communications and radio navigational apparatus with a very low probability of failure, the centralized and simplified control of all the radio communications and radio navigational apparatus by the pilot and/ the copilot, as well as the provision of these functions by means of a redundant structure and simplified control units.

SUMMARY OF THE INVENTION

To these ends, in accordance with the invention, the system for the centralized control of two groups of radio communications apparatus and two groups of radio navigational apparatus mounted on board an aircraft provided with two flight management computers, each of said flight management computers controlling the operation of the radio navigational apparatus of one of said groups is remarkable:

in that it includes two control devices dialoguing with each other, associated respectively with said groups of radio communications apparatus and each including computing means, radio communications apparatus selection means, radio navigational apparatus selection means, frequency adjustment means and switching means;

in that each control device is adapted for controlling, under normal operating conditions, the whole of the radio communications apparatus of the group which is associated therewith and, under emergency operating conditions when the other control device is out of service, the whole of the radio communications apparatus of the group associated with this other control device., in that each flight management computer is adapted for controlling, under normal operating conditions, the whole of the radio navigational apparatus of the group which is associated therewith and, under emergency operating conditions when the other flight management computer is out of service, the whole of the radio navigational apparatus of the group associated with this other flight management computer;

in that control of a group of radio navigational apparatus by the associated flight management computer is provided through a first position of the switching means of that one of the two control devices which is associated for this purpose with said computer; and in that, in the case where the two flight management computers are out of service, the control of each of the groups of radionavigational apparatus is obtained by the associated control device through a second position of said switching means thereof.

Thus, a particularly reliable centralized control system is obtained providing:

direct control of the radiocommunications apparatus from signals elaborated in any one of the control devices;

direct control of the radionavigational apparatus from any one of the flight management computers or from the associated control device;

use of each control device as a simple transit element for the signals from the associated flight management computer;

simple construction of the control devices, by avoiding the need for multiplexing of the signals of the flight management computers and those of the control devices.

Preferably, the two control devices are installed on the central pedestal of the flight deck, within reach of the pilot and the copilot.

In some cases, it may be advantageous particularly from the point of view of flexibility in use and operation of the system of the invention, to provide a third control device installed for example in the ceiling of the flight deck.

Also, in a variant of the invention, the system for the centralized control of two groups of radiocommunications apparatus and two groups of radionavigational apparatus mounted on board an aircraft provided with two flight management computers, each of said flight management computers controlling the operation of the radionavigational apparatus of one of said groups, is remarkable:

in that it comprises two main control devices dialoguing with each other, associated respectively with said groups of radiocommunications apparatus and each comprising computing means, radiocommunications apparatus selection means, radionavigational apparatus selection means, frequency adjustment means, first switching means and second switching means;

in that it includes an auxiliary control device dialoguing with said main control devices and including computing means, radiocommunications apparatus selection means and frequency adjustment means;

in that, under normal operating conditions, the whole of the radiocommunications apparatus of one group is controllable either from the main control device which is associated therewith through a first position of said second switching means, or from said auxiliary control device through the corresponding main control device;

in that, when one main control device is out of service, the whole of the radiocommunications apparatus of the asociated group is controllable from the other main control device or from the auxiliary control device, through a second position of said second switching means of the main control device out of service., in that, when the two main control devices are out of service, the whole of the radiocommunications apparatus of the group associated with one of said main control devices is controllable from the auxiliary control device through said second position of said switching means of the corresponding main control device;

in that, when a main control device and the auxiliary control device are out of service, the radiocommunications apparatus of the group associated with the main control device out of service are controllable from the other main control device;

in that each flight management computer is adapted for controlling, under normal operating conditions, the whole of the radionavigational apparatus of the group which is associated therewith and, under emergency operating conditions when the other flight management computer is out of service, the whole of the radionavigational apparatus of the group associated with this other flight management computer;

in that control of the group of radionavigational apparatus by the associated flight management computer is provided through a first position of said first switching means of that one of the two main control devices which is associated for this purpose with said computer; and in that, in the case where the two flight management computers are out of service, the control of each of the groups of radionavigational apparatus is obtained by the associated main control device through a second position of said first switching means thereof.

Such an auxiliary control device may have a structure similar to that of the main control devices, only a part of this structure being used.

So as to obtain a simple structure for the system of the invention, it is advantageous for each of the radiocommunications apparatus to comprise a controllable priority input and an auxiliary input, said inputs being adapted so that, when said priority input is driven, said auxiliary input is closed and when said priority input is not driven, said auxiliary input is open and that the controllable priority inputs and the auxiliary inputs of the radio communications apparatus of each of said groups are respectively connected to the control device associated with this group and to the control device associated with the other of said groups.

For an identical reason, it is also advantageous for each of the radionavigational apparatus to comprise a controllable priority input and an auxiliary input, said inputs being adapted so that, when said priority input is driven , said auxiliary input is closed and, when said priority input is not driven, said auxiliary input is open and that the controllable priority inputs and the auxiliary inputs of the radionavigational apparatus of each of said groups are respectively connected to the flight management computer associated with this group through the switching means of the associated control device and to the flight management computer associated with the other of said groups by a direct connection.

Preferably, the controllable priority inputs of the radiocommunications apparatus and of the radionavigational apparatus are activated by a simple electric signal, such as connection to the ground for example.

BRIEF DESCRIPTION OF THE DRAWINGS

The Figures of the accompanying drawings will better show how the invention may be provided. In these Figures, identical references designate similar elements.

In FIGS. 4 to 8 and 11 to 13, the active connection in the operating modes illustrated have been shown with a thick black line.

DESCRIPTION OF THE PREFERRED EMBODIMENTS

Figure 1:
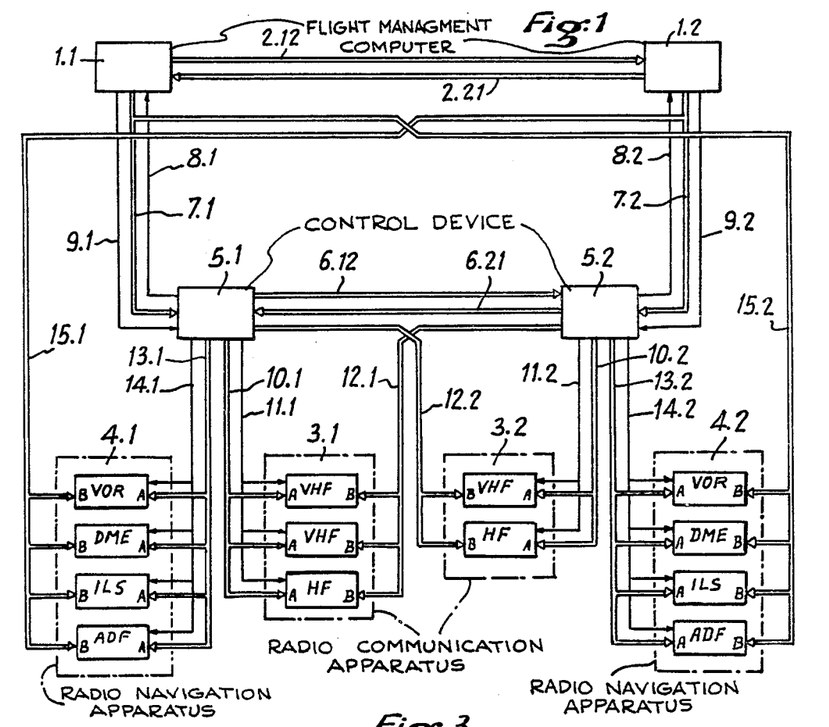
FIG. 1 is a schematical representation of one embodiment of the system of the invention, FIG. 2 gives the block diagram of one embodiment of the control device for the system of FIG. 1.

The system of the invention, shown schematically in FIG. 1, is intended for the centralized control of a plurality of radiocommunications and radionavigational apparatus on board an aircraft and it includes two flight management computers.

As is known, these flight management computers, which bear respectively the references 1.1 and 1.2 in FIG. 1, calculate the position of the aircraft and work out the flight plans from prerecorded data and situation and navigation parameters. They are universally designated in the technique under the name "FMC" (Flight Management Computer).

Although a single FMC would generally be sufficient on board an aircraft, it is preferable, particularly for safety reasons, to provide two. The two computers 1.1 and 1.2 dialogue with each other over two bus lines 2.12 and 2.21 which convey respectively the data from computer 1.1 towards computer 1.2 and from computer 1.2 towards the computer 1.1.

For safety reasons and ease of use, the two radiocommunications apparatus provided on board the aircraft are redundant. They are divided into two groups 3.1 and 3.2. For example, group 3.1 comprises two VHF apparatus and an HF apparatus, whereas group 3.2 comprises a VHF apparatus and an HF apparatus.

Similarly and for identical reasons the radionavigational apparatus carried on board are divided into two groups 4.1 and 4.2. For example, each of these groups includes a VOR apparatus, a DME apparatus, an ILS apparatus and an ADF apparatus.

Each of these radiocommunications apparatus and each of the radionavigational apparatus of the four groups 3.1, 3.2, 4.1 and 4.2 has a priority control input A and an auxiliary control input B.

The priority input A, which corresponds to normal operation of an apparatus, is controllable by an activation signal, reprsented for example by ground; when said activation signal is present, the apparatus is controllable by the single input A, the auxiliary input B of this latter being inhibited. On the other hand, the absence of an activation signal at the priority input A of an apparatus inhibits this input and allows said apparatus to be controlled through the associated auxiliary input B. Thus, should there be an absence of said activation signal at a priority input A, the radiocommunications or radionavigational apparatus may be controlled in emergency through its auxiliary input B.

In accordance with the present invention, two control devices 5.1 and 5.2 are additionally provided, able to dialogue with each other through directional bus lines 6.12 and 6.21. The control device 5.1 is inserted between computer 1.1.and the groups 3.1 and 4.1. Symmetrically, the control device 5.2 is inserted between the computer 1.2 and the groups 3.2 and 4.2

Each control device 5.1 and 5.2 is capable of receiving data from the corresponding computer 1.1 or 1.2 through a bus line 7.1 or 7.2, respectively. Over a connection 8.1 or 8.2 each control device 5.1 and 5.2 may address a status signal to the associated computer 1.1 or 1.2. Furthermore, over a connection 9.1 or 9.2, each computer 1.1 or 1.2 may address to the associated control device 5.1 or 5.2 an activation signal for the priority inputs A of the associated navigational apparatus. Furthermore:

bus line 10.1 and a control line 11.1 connects the control device 5.1 to the inputs A of the radiocommunications apparatus of the group 3.1;

a bus line 12.1 connects the control device 5.2 to the inputs B of the radiocommunications apparatus of the group 3.1;

a bus line 10.2 and a control line 11.2 connect the control device 5.2 to the inputs A of the radiocommunications apparatus of the group 3.2;

a bus line 12.2 connects the control device 5.1 to the inputs B of the radiocommunications apparatus of the group 3.2;

a bus line 13.1 and a control line 14.1 connect the control device 5.1 to the inputs A of the radionavigational apparatus of the group 4.1;

a bus line 15.1 connects the computer 1.2 to the inputs B of the radionavigational apparatus of the group 4.1;

a bus line 13.2 and a control line 14.2 connect the control device 5.2 to_the inputs A of the radionavigational apparatus of the group 4.2; and a bus line 15.2 connects the computer 1.1 to the inputs B of the radionavigational apparatus of the group 4.2.

Figure 2:
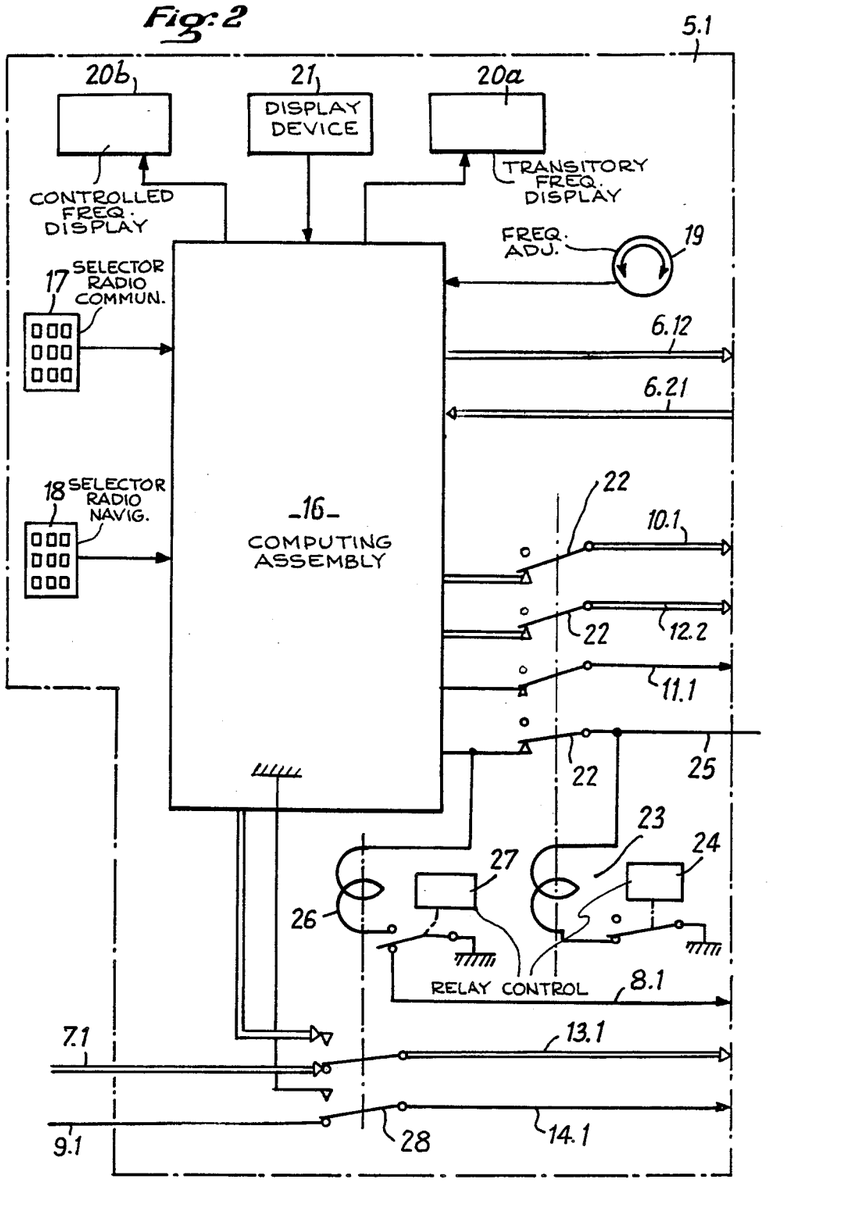

In FIG. 2, one embodiment has been shown of the control device 5.1. The control device 5.2 is identical to this latter, so that FIG. 2 also shows this control device 5.2 provided that the indices .1 .2, .12 and .21 provided for the different references 6 to 14 are replaced respectively by the indices .2, .1, .21 and .12.

This embodiment includes computing assembly 16, with which are associated means 17 for selecting an apparatus among the radiocommunications apparatus of groups 3.1 and 3.2, means 18 for selecting an apparatus from the radionavigational apparatus of group 4.1 and frequency adjustment means 19. In the example shown, the frequency adjustment means 19 are common to the radiocommunications apparatus and to the radionavigational apparatus. With the computing assembly 16 are further associated a transitory frequency display 20a, display device 20b for displaying the frequency presently controlled and a device 21 for transferring the display from the device 20a to device 20b and vice versa.

The bus lines 10.1, 12.2 and the control line 11.1 are connected to the computing assembly 16 by the make contacts 22 of a relay 23, actuatable by a control member 24. An additional make contact 22 of relay 23 feeds the computing assembly 16 with electric power from a power supply 25.

Furthermore, a relay 26 fed from power supply 25 controlled by a member 27 provides by its break contacts 28 the connection between the bus line 7.1 and the bus line 13.1 as well as that between the control line 9.1 and the control line 14.1. When the control member 27 is actuated, relay 26 interrupts, these connections and connects the bus line 13.1 to the computing assembly 16 and line 14.1 to a signal source for activating the inputs A of the radionavigational apparatus (ground). The control line 8.1 detects the passage from the break to the make position relay 26.

Figure 3:
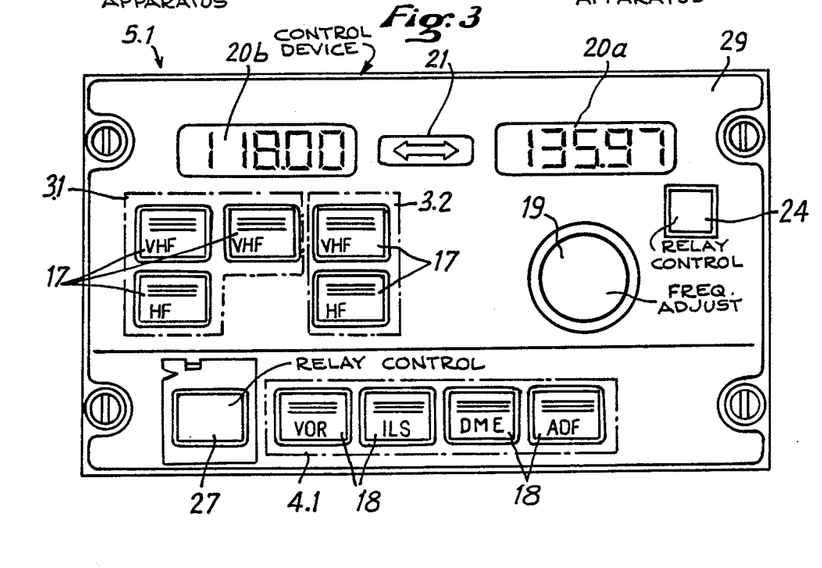
FIG. 3 is a view of the front face of the control device of FIG. 2.

In FIG. 3, the front face 29 has been shown of an electronic unit forming control device 5.1. On the front face 29 are provided:

three keys 17, intended respectively for selecting one or other of the two VHF apparatus and of the HF apparatus of group 3.1., two keys 17, intended respectively for selecting one or other of the two VHF and HF apparatus of group 3.2;

four keys 18, intended respectively for selecting one or other of the VOR, ILS, DME and ADF apparatus of group 4.1;

a double rotary knob 19 for adjusting the frequency of the apparatus of groups 3.1, 3.2 and 4.1;

the display devices 20a and 20b as well as the transfer device 21;

the member 24 for controlling relay 23; and the member 27 for controlling the relay 26.

Thus, when a member of the crew of the aircraft wishes to modify, from the control device 5.1, the frequency at which one of the radiocommunications apparatus of groups 3.1 or 3.2 is operating, which frequency is then displayed on device 20b, he begins by choosing this apparatus by operating the appropriate key 17, so that the computing assembly 16 knows the apparatus whose frequency is to be modified. Then, through the rotary knob 19, the operator chooses the desired frequency which appears on the display device 20a. By operating the transfer device 21, the computing assembly 16:

transfers the display of the new frequency from device 20a to device 20b; and elaborates a frequency control signal corresponding to the new frequency and including a specific address of the chosen apparatus, whose frequency it is desired to modify.

Then, if this chosen apparatus forms part of the group 3.1, the computing assembly 16 addresses said frequency control signal over the bus line 10.1 through the corresponding make contact 22 of relay 23. Furthermore, because of the position of relay 23, the line 11.1 is activated (to ground). Consequently, all the inputs A of the three apparatus of group 3.1 are activated and receive the frequency control signal. However, because of the address contained therein, only the apparatus concerned will use the signal on line 10.1 for modifying its frequency to the new chosen value. In addition, over the dialogue line 6.12, the computing assembly 16 of the control device 5.1 warns the computing assembly 16 of the control device 5.2 of the intervening frequency change. The control device 5.2 then takes this information into account, which it will display in its device 20b when the apparatus concerned is selected by the device 5.2.

On the other hand, if the radiocommunications apparatus whose frequency it is desired to modify from the control device 5.1 belongs to the group 3.2, the assembly 16 of device 5.1 sends the required information to the assembly 16 of device 5.2 over the line 6.12. Control device 5.2 then operates the desired frequency change over its lines 10.2 and 11.2, by actuating the input A of the apparatus concerned.

Of course, the frequency control of the radiocommunications apparatus of groups 3.1 and 3.2 may be achieved, perfectly symmetrically, from the control device 5.2. Consequently, as is shown schematically in FIG. 4, on which the active bus lines, under normal operating conditions, have been shown with a thick black line, the control for changing the frequency of the radiocommunications apparatus is provided from devices 5.1 and 5.2 over the bus lines 6.12, 6.21, 10.1 and 10.2 and the control lines 11.1 and 11.2.

Figure 4:
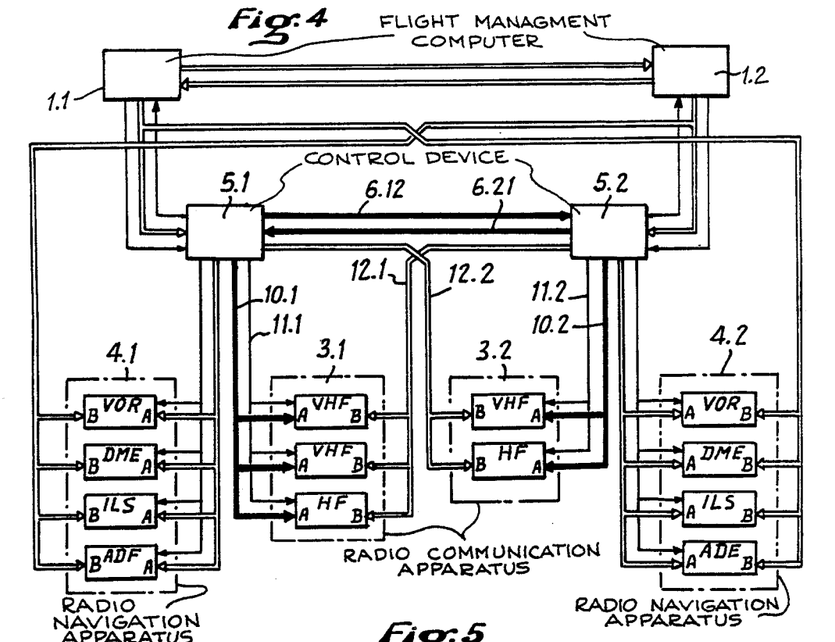
FIG. 4 illustrates schematically the normal operation of the system of FIG. 1 for controlling the radiocommunications apparatus.

It will be noted that the frequency control signal generated by the assembly 16 of device 5.1 or of device 5.2 is also conveyed by the corresponding bus line 12.1 or 12.2. However, the inputs B of the radiocommunications apparatus are then inhibited (since the inputs A are active) so that the signal on lines 12.1 and 12.2 has no action.

Figure 5:
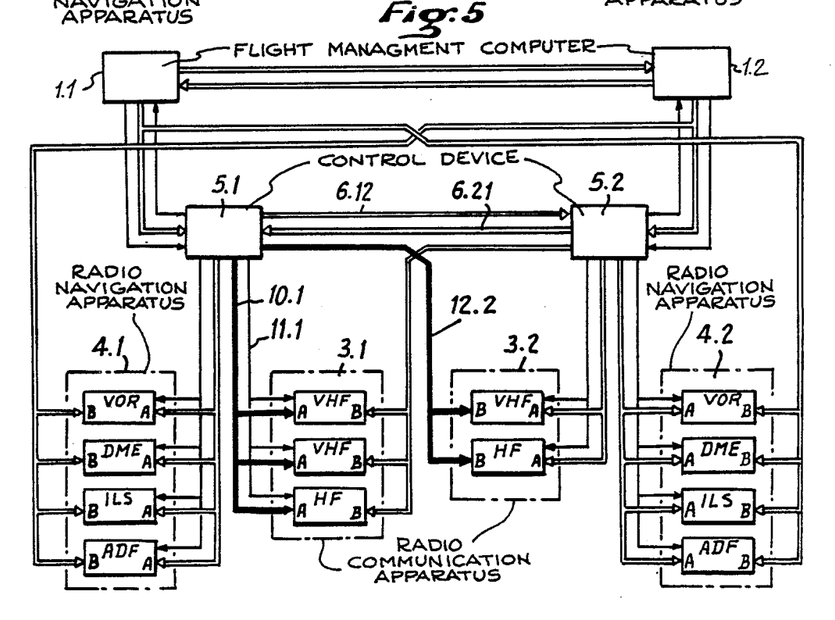
FIG. 5 illustrates schematically a breakdown configuration in the operation of the system of FIG. 1, for controlling the radiocommunications apparatus.

On the other hand, when one of the control devices is out of circuit (breakdown and/or switching out of circuit by operating the control member 24 of its power supply relay 23), the inputs A of the associated radiocommunications apparatus are not activated by the corresponding line 11.1 or 11.2, so that the inputs B are responsive to the frequency change signal present on line 12.1 or 12.2 connected to the other computer device 5.1 or 5.2. Thus, in the case of a breakdown and/or switching out of circuit of the control device 5.2, the frequency change of the apparatus of group 3.2 is provided through the bus line 12.2.

This configuration is illustrated by FIG. 5 which further shows that the frequency change of the apparatus of group 3.1 remains ensured by the lines 10.1 and 11.1. Of course, symmetrically, if device 5.1 were broken down and/or out of circuit, the frequency change of the radiocommunications apparatus would be provided, from device 5.2, through lines 10.2 and 11.2 for the apparatus of group 3.2 and through line 12.1 for the apparatus of group 3.1.

Figure 6:
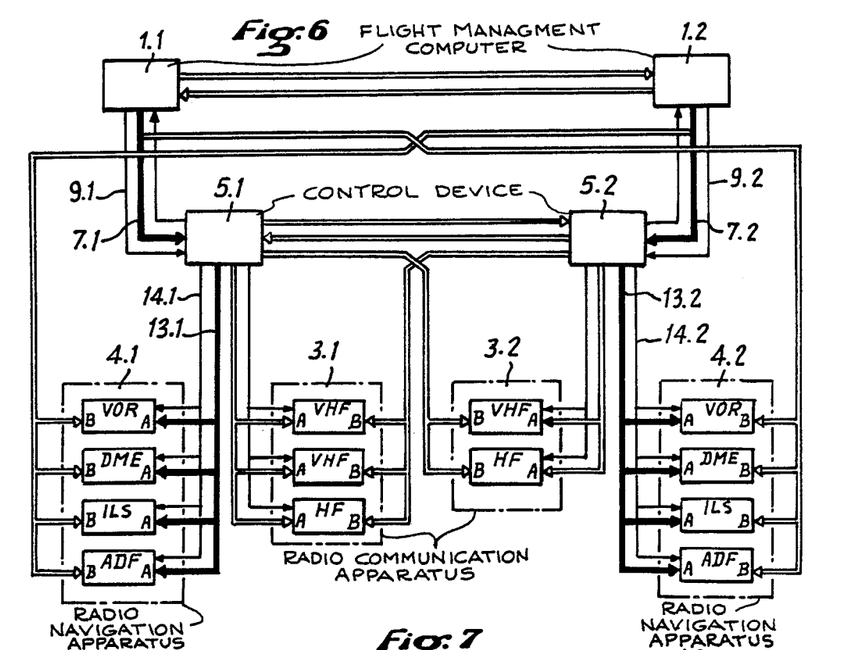
FIG. 6 illustrates schematically the normal operation of the system of FIG. 1, for controlling the radionavigational apparatus.

Furthermore, under normal operation of the control devices 5.1 and 5.2, the connections are provided between lines 7.1 and 13.1, 9.1 and 14.1, 7.2 and 13.2, 9.2 and 14.2, through the break contacts 28 of the relay 26. Consequently, the flight management computer 1.1 may directly provide the frequency change of one of the radionavigational apparatus of group 4.1 by addressing over line 7.1 and so over line 13.1, a frequency control signal including a specific address for the apparatus concerned and over the control line 9.1, and so over line 14.1, an activation signal. The radionavigational apparatus are therefore then frequency controlled through their inputs A. Symmetrically and identically, the flight management computer 1.2 may proceed with the frequency control of the radionavigational apparatus of group 4.2. This configuration is illustrated by FIG. 6.

Figure 7:
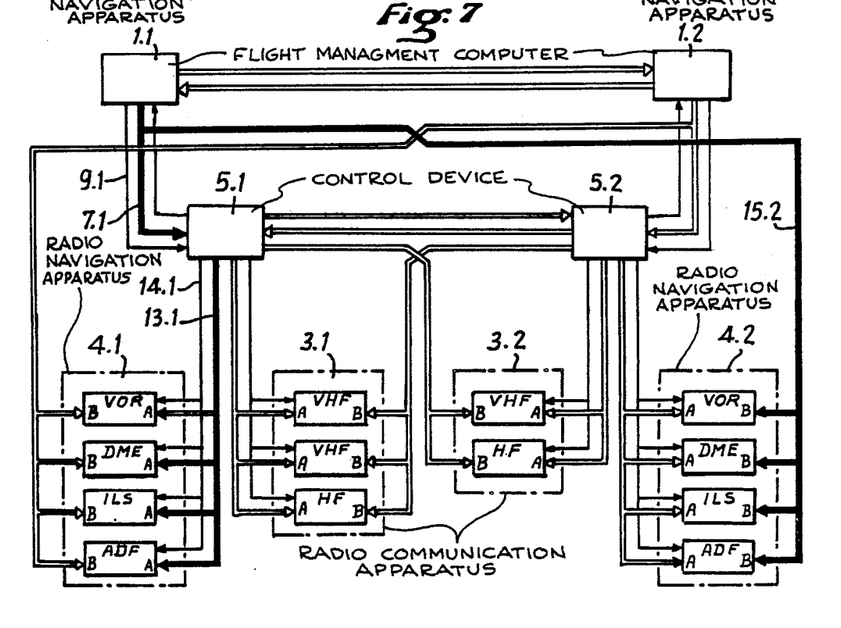
FIGS. 7 and 8 illustrate schematically two breakdown configurations in the operation of the system of FIG. 1, for controlling the radionavigational apparatus.

However, if one of the flight management computers 1.1 or 1.2 breaks down and/or is switched out of circuit, it is then possible to control from the computer remaining in operation the radionavigational apparatus of a group associated with the computer out of service. For that, the orders are sent to the inputs B of said apparatus over the appropriate line 15.1 or 15.2 conveying a signal containing the specific address of the navigational apparatus whose frequency is to be modified. In fact, these inputs B are then active, since then the line 14.1 or 14.2 does not convey any enabling signal for the inputs A. This results from a breakdown of the computer 1.1 or 1.2. In FIG. 7, the configuration has been illustrated schematically for which the flight management computer 1.2 is out of service, so that the radionavigational apparatus of group 4.2 are frequency controlled by computer 1.1 through the line 15.2. Of course, the configuration would be symmetrical if computer 1.1 were out of service, computer 1.2 then controlling the apparatus of group 4.1 through the line 15.1

Figure 8:
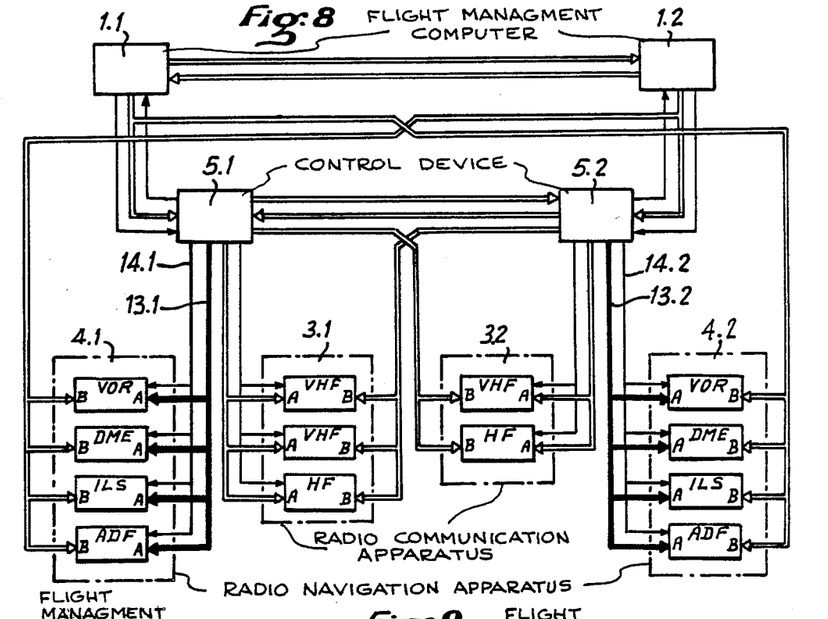
Figure 9:
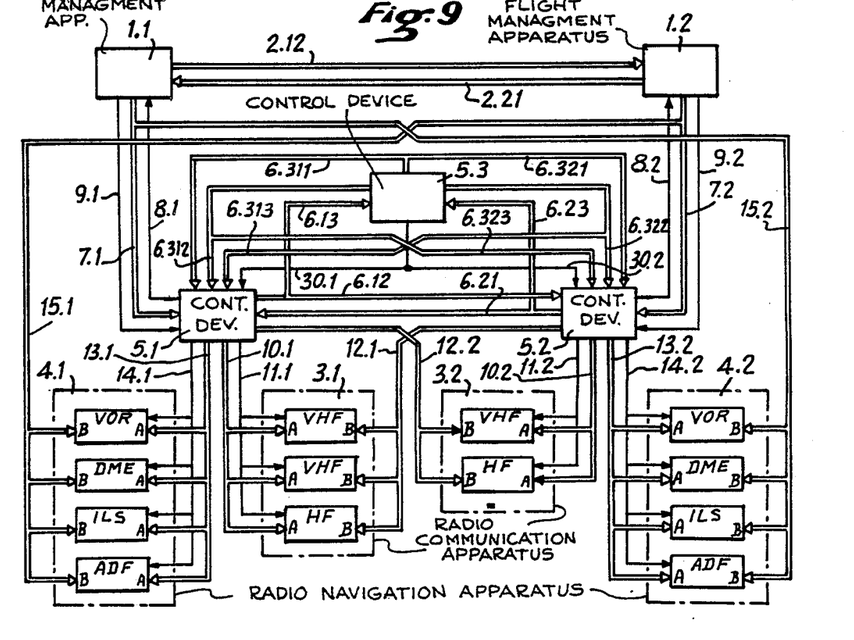
FIG. 9 illustrates schematically a variant of construction of the system of the invention.

In the case where the two management computers 1.1 and 1.2 are out of service, the members 27 of the two control devices 5.1 and 5.2 are actuated, so that relay 26 switches and lines 13.1 and 14.1 on the one hand, 13.2 and 14.2 on the other are connected through the make contacts 28 of said relay 26 to the corresponding computing assembly 16 and activation signal source. Each control device 5.1 and 5.2 may then control the radionavigational apparatus of groups 4.1 and 4.2 through its computing assembly 16. The corresponding configuration is shown in FIG. 8. In the variant shown in FIG. 9, the system of the invention has an additional auxiliary control device 5.3 capable:

of dialoguing with the control device 5.1 through the bus lines 6.13 and 6.311;

dialoguing with the control device 5.2 through the bus lines 6.23 and 6.321;

addressing the signals for activating the inputs A of the radiocommunications apparatus over lines 30.1 and 30.2, connected respectively to the control devices 5.1 and 5.2.

addressing frequency information for the radiocommunications apparatus over the bus lines 6.312 and 6.313 connected to the control device 5.1 and over the bus lines 6.322 and 6.323 connected to the control device 5.2.

Except for the auxiliary control device 5.3, the bus lines 6.13, 6.311, 6.312, 6.313, 6.23, 6.321, 6.322, 6.323 and the control lines 30.1 and 30.2, the system of FIG. 9 is identical to that of FIG. 1.

Figure 10:
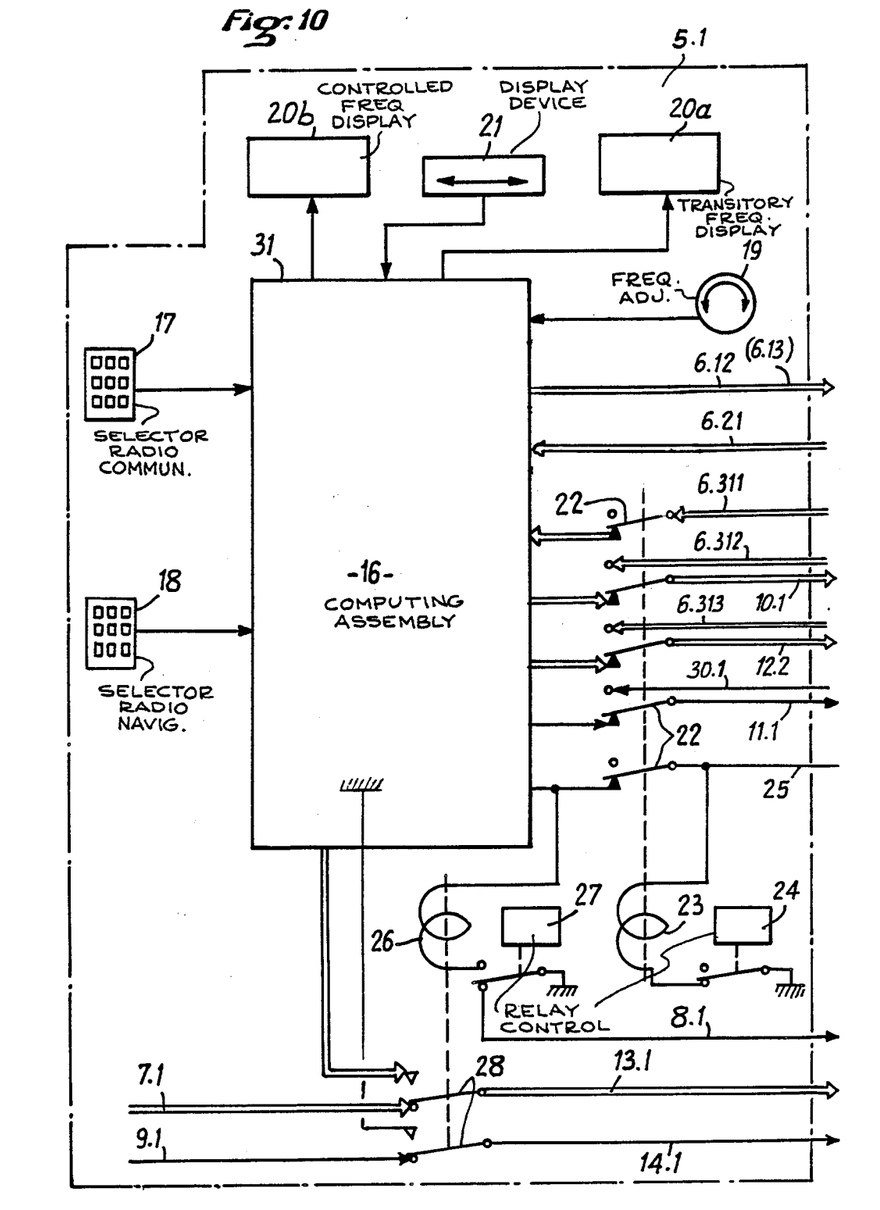
FIG. 10 is the block diagram of a control device for the system of FIG. 9.

In FIG. 10, one embodiment has been shown of the control device 5.1 appropriate for the system of FIG. 9. This embodiment (which applies mutatis mutandis to device 5.2) is essentially identical to the embodiment shown in FIG. 2, except that:

the bus line 6.13 is common with line 6.12, the bus line 6.311 is connected to the computing assembly 16 through the make position of an aditional contact 22 of relay 23;

the contact 22, which in the make position of relay 23 connects the bus line 10.1 to the computing assembly 16, connects said bus line 10.1 to the bus line 6.312 through its break position;

contact 22, which in the make position of relay 23 connects the bus line 12.2 to the computing assembly 16, connects through its break position said bus line 12.2 to the bus line 6.313; and the contact 22, which in the make position of relay 23 connects the control line 11.1 to the computing assembly 16, connects said control line 11.1 to the line 30.1 through its break position.

Figure 11:
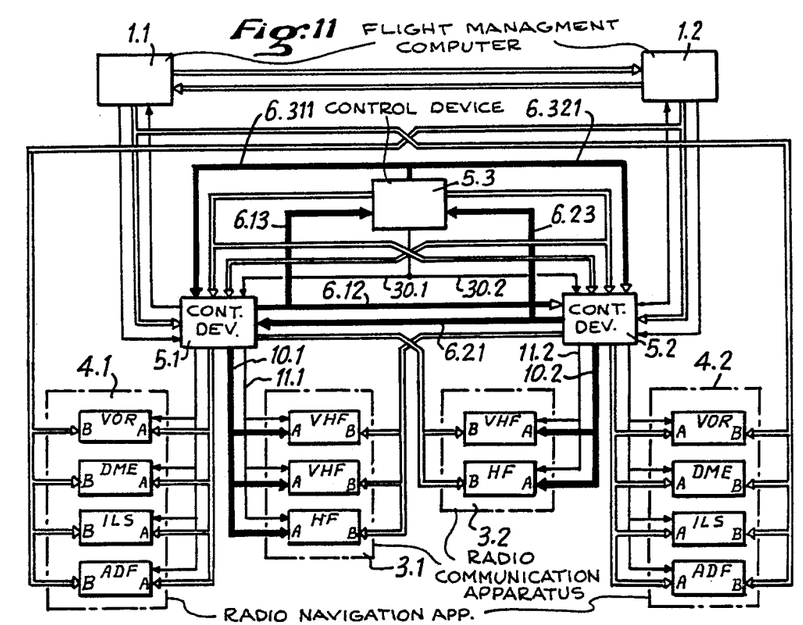
FIG. 11 illustrates schematically the normal operation of the system of FIG. 9 for controlling the radiocommunications apparatus.

Thus, under normal operating conditions (positions shown in FIG. 10), the control devices 5.1, 5.2 and 5.3 dialogue with each other over lines 6.12, 6.13, 6.21, 6.23, 6.311 and 6.321 and it is possible to control any of the radiocommunications apparatus of groups 3.1 and 3.2 from any of said control devices, over lines 10.1, 11.1, 10.2 and 11.2. This configuration is shown in FIG. 11.

Figure 12:
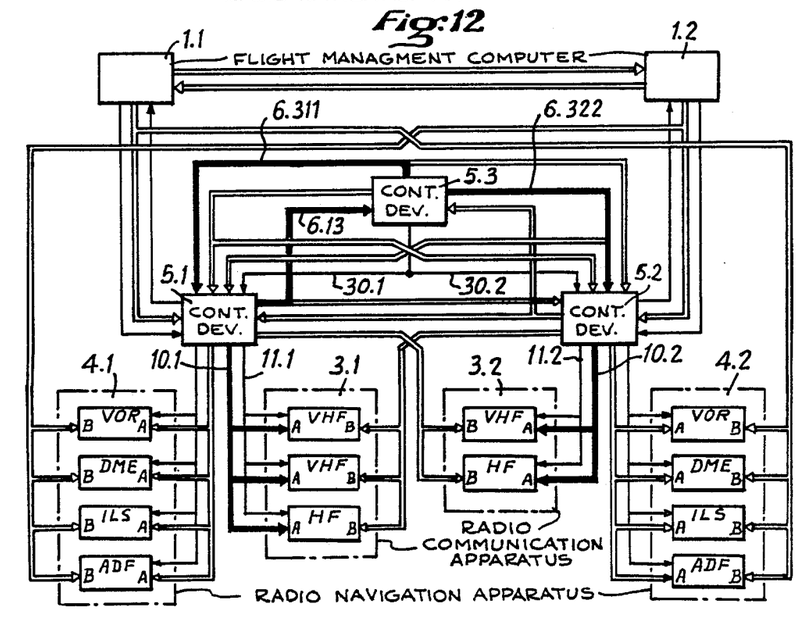
FIGS. 12 and 13 illustrate schematically two breakdown configurations in the operation of the system of FIG. 9 for controlling the radiocommunications apparatus.

On the other hand, if one of the control devices 5.1 or 5.2 is out of service and if its contacts 22 have switched to the break position, a continuity is automatically established between the bus line 6.312 (or 6.322) and the line 10.1 (or 10.2), as well as between the control lines 30.1 (or 30.2) with the control line 11.1 (or 11.2). Consequently, the radiocommunications apparatus associated with the control device 5.1 (or 5.2) out of service may be controlled from any of the control devices 5.2 (or 5.1) and 5.3, the control orders transiting through the control device out of service. In FIG. 12, the case has been shown where the control device 5.2 is out of service.

Figure 13:
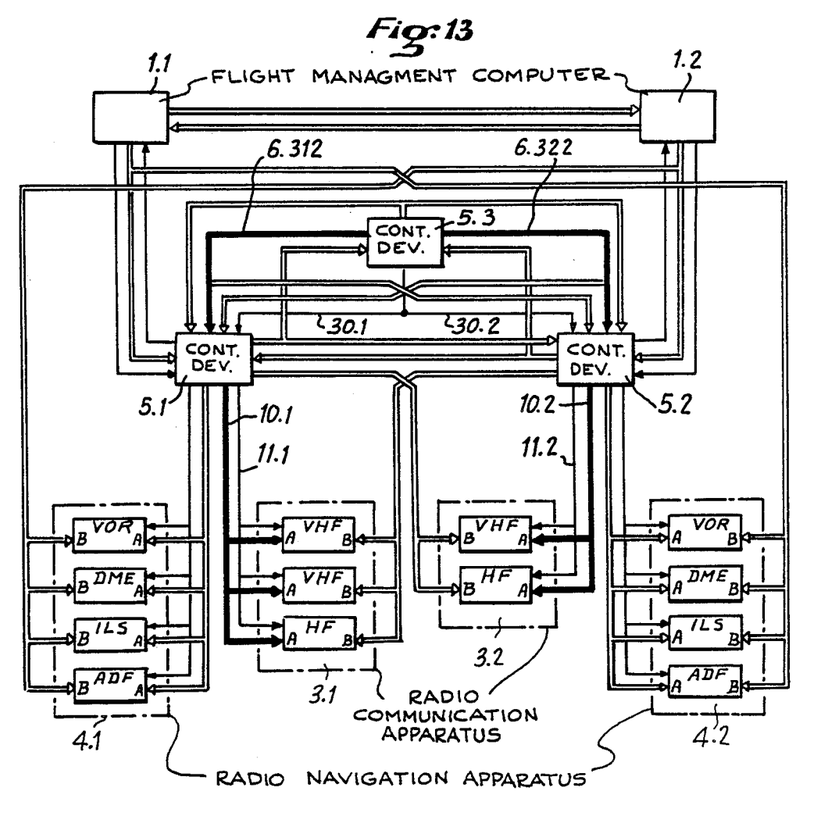

In FIG. 13, it has been assumed that device 5.1 and device 5.2 were out of service and that the radiocommunications apparatus were controlled from device 5.3 alone.

In the case where device 5.3 is out of service, we have again the configuration shown in FIG. 4. Similarly if device 5.3 and one of devices 5.1 or 5.2 are out of service, we have a configuration similar to that of FIG. 5.

In so far as control of the radionavigational apparatus are concerned, the control device 5.3 is inoperative and everything happens as for the embodiment shown in FIG. 1.

What is claimed is:

1. In a system for the centralized control of two groups of radiocommunications apparatus and two groups of radionavigational apparatus mounted on board an aircraft provided with two flight management computers, each of said flight management computers being associated with a respective one of said groups of radionavigational apparatus, wherein:
   - two control device are provided dialoguing with each other, each of said devices being respectively associated with one of said groups of radiocommuncations apparatus and each including computing means, radiocommunications apparatus selection means, radionavigational apparatus selection means, frequency adjustment means and switching means;
   - each control device is capable of controlling, under normal operating conditions, all of the radiocommunications apparatus of the group which is associated therewith and, under emergency operating conditions when the other control device is out of service, all of the radiocommunications apparatus of the group associated with said other control device;
   - each flight management computer is able to control, under normal operating conditions, all of the radionavigational apparatus of the group which is associated therewith and, under emergency operating conditions when the other flight management computer is out of service, all of the radionavigational apparatus of the group associated with said other flight management computer;
   - each of said control devices is associated with a respective one of said flight management computers;
   - the control of one group of radionavigational apparatus by the associated flight management computer is provided through a first position of the switching means of its associated control device; and
   - in the case where the two flight management computers are out of service, the control of each of the groups of navigational apparatus is obtained by the associated control device through a second position of said switching means thereof.

2. The system as claimed in claim 1, wherein each of the radiocommuncations apparatus includes a controllable priority input and an auxiliary input, said inputs being adapted so that, when said priority input is driven, said auxiliary input is closed and when said priority input is not driven, said auxiliary input is open and said controllable priority inputs and said auxiliary input of the radiocommunications apparatus of each of said groups are respectively connected to the control device associated with this group and to the control device associated with the other said groups.

3. The system as claimed in claim 2, wherein said controllable priority inputs are activated by a simple electric signal, such as connection to ground.

4. The system as claimed in claim 1, wherein each of the radionavigational apparatus includes a controllable priority input and an auxiliary input, said inputs being adapted so that, when said priority input is driven, said auxiliary input is closed and when said priority input is not driven, said auxiliary input is open and said controllable priority inputs and said auxiliary inputs of the radionavigational apparatus of each of said groups are respectively connected to the flight management computer associated with this group through the switching means of the associated control device and to the flight management computer associated with the other of said groups through a direct connection.

5. A system for the centralized control of two groups of radiocommunications apparatus and two groups of radionavigational apparatus mounted on board an aircraft provided with two flight management computers, each of said flight management computers being associated with a respective one of said groups of radionavigational apparatus, wherein:
   - two main control devices are provided dialoguing with each other, each of said devices being respectively associated with one of said groups of radiocommunications apparatus and each including computing means, radiocommunications apparatus selection means, radionaviagational apparatus selection means, frequency adjustment means, first switching means and second switch means;
   - an auxiliary control device is further provided dialoguing with said main control devices and including computing means, radiocommunications apparatus selection means and frequency adjustment means;
   - under normal operating conditions all of the radiocommunications apparatus of one group thereof is controllable either from the associated main control device through a first position of said second switching means, or from said auxiliary control device through the corresponding main control device;

when a main control device is out of service, all of the radiocommunications apparatus of the assocated group is controllable from the other main control device or from the auxiliary control device through a second position of said second switching means of the main control device out of service;

when both main control devices are out of service, all of the radiocommunications apparatus of the group associated with one of said main control devices is controllable from the auxiliary control device through said second position of said switching means of the corresponding main control device;

when a main control device and the auxiliary control device are out of service, the radiocommunications apparatus of the group associated w:ith said main contorl device out of service are controllable from the other main control device;

each flight management computer is capable of controlling under normal operating conditions, all of the radionavigational apparatus of the group which is associated therewith and, under emergency operating conditions when the other flight management computer is out of service, all of the radionavigational apparatus of the group associated with said other flight management computer;

each of said control devices is associated with a respective one of said flight management computers;

control of the group of radionavigational apparatus by the associated flight management computer is provided through a first position of said first switching means of its associated control device; and in the case where the two flight management computers are out of service, control of each of the groups of the radionavigational apparatus is obtained by the associated main control device through a second position of said first switching means thereof.

6. The system as claimed in claim 5, wherein the said auxiliary control device has a structure identical to that of the main control devices.

* * * * *